US008783610B2

(12) United States Patent
Stephan

(10) Patent No.: US 8,783,610 B2
(45) Date of Patent: Jul. 22, 2014

(54) TRANSVERSE SPLICING PLATE FOR CREATING A FUSELAGE, AND A METHOD FOR CONNECTING TWO, IN PARTICULAR WOUND, CFP FUSELAGE SECTIONS

(75) Inventor: Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 735 days.

(21) Appl. No.: 12/740,183

(22) PCT Filed: Oct. 30, 2008

(86) PCT No.: PCT/EP2008/009176
§ 371 (c)(1),
(2), (4) Date: Apr. 28, 2010

(87) PCT Pub. No.: WO2009/056319
PCT Pub. Date: May 7, 2009

(65) Prior Publication Data
US 2010/0237194 A1 Sep. 23, 2010

Related U.S. Application Data

(60) Provisional application No. 60/984,042, filed on Oct. 31, 2007.

(30) Foreign Application Priority Data

Oct. 31, 2007 (DE) .......................... 10 2007 052 098

(51) Int. Cl.
*B64C 1/06* (2006.01)
(52) U.S. Cl.
USPC .......................... 244/120; 244/119; 29/890.01
(58) Field of Classification Search
CPC ................................ B64C 1/069; B64C 1/068
USPC .................. 29/525.05, 524.1, 525.01, 597.2, 29/890.01; 244/119, 117 R, 120, 131, 244/123.1
See application file for complete search history.

(56) References Cited

U.S. PATENT DOCUMENTS 4,793,727 A * 12/1988 Schmaling .................... 403/340
4,839,771 A * 6/1989 Covey ........................... 361/218

(Continued)

FOREIGN PATENT DOCUMENTS

DE 69314175 T2 3/1998
FR 808710 A 2/1937

(Continued)

OTHER PUBLICATIONS

International Search Report for corresponding PCT application PCT/EP08/009176, dated Mar. 3, 2009.

(Continued)

*Primary Examiner* — Peter DungBa Vo
*Assistant Examiner* — Kaying Kue
(74) *Attorney, Agent, or Firm* — Ingrassia Fisher & Lorenz P.C.

(57) ABSTRACT

A transverse splicing plate for producing a fuselage of an aircraft by connecting several CFP fuselage sections that have in particular been produced in the winding method, in each case by forming a transverse seam, wherein the flexible transverse splicing plate is of a multilayer construction, in other words it comprises a multitude of plate segments arranged one above the other, wherein each of the plate segments comprises a multitude of longitudinal slits, each being able independently of each other to make small radial bending movements in order to cause tolerance compensation in radial direction between the fuselage sections to be joined, in which tolerance compensation a sliding movement between the subplates of the plate segments arranged one above the other takes place in axial direction of the barrel-shaped fuselage sections, and wherein on the inside the ends of the fuselage sections comprise chamfers; as well as a method for producing a connection between two CFP fuselage sections, which have preferably been produced in the winding method, by means of a transverse splicing plate according to the invention.

7 Claims, 3 Drawing Sheets

(56) References Cited

U.S. PATENT DOCUMENTS

| | | | |
|---|---|---|---|
| 4,888,451 A * | 12/1989 | Toni et al. | 174/94 R |
| 4,920,449 A * | 4/1990 | Covey | 361/216 |
| 5,429,326 A * | 7/1995 | Garesche et al. | 244/133 |
| 5,972,524 A * | 10/1999 | Childress | 428/615 |
| 6,042,055 A | 3/2000 | Messsinger | |
| 6,327,132 B1 * | 12/2001 | Andrivet et al. | 361/218 |
| 7,554,785 B2 * | 6/2009 | Hawley | 361/218 |
| 7,721,495 B2 * | 5/2010 | Kismarton | 52/309.16 |
| 7,857,258 B2 * | 12/2010 | Normand et al. | 244/120 |
| 7,938,367 B2 * | 5/2011 | Jarsaillon et al. | 244/131 |
| 7,955,713 B2 * | 6/2011 | Roebroeks et al. | 428/608 |
| 8,016,230 B2 * | 9/2011 | Fogarty et al. | 244/117 R |
| 2005/0213278 A1 | 9/2005 | Hawley | |
| 2006/0060705 A1 | 3/2006 | Stulc | |
| 2006/0236652 A1 | 10/2006 | Kismarton | |
| 2008/0210819 A1* | 9/2008 | Jarsaillon et al. | 244/120 |
| 2010/0320320 A1* | 12/2010 | Kismarton | 244/119 |

FOREIGN PATENT DOCUMENTS

| | | |
|---|---|---|
| FR | 1462186 A | 4/1966 |
| WO | 9401277 A | 1/1994 |

OTHER PUBLICATIONS

International Preliminary Report on Patentability and Written Opinion for corresponding PCT application PCT/EP08/009176, dated Jun. 22, 2010.

Chinese Office Action for corresponding Chinese Application 200880114437.0, dated Oct. 22, 2012.

German Office Action for corresponding German Application 102007052098.2, dated Sep. 20, 2011 (non English).

* cited by examiner

TRANSVERSE SPLICING PLATE FOR CREATING A FUSELAGE, AND A METHOD FOR CONNECTING TWO, IN PARTICULAR WOUND, CFP FUSELAGE SECTIONS

CROSS REFERENCE TO RELATED APPLICATIONS

This application claims priority to PCT Application No. PCT/EP2008/009176, filed Oct. 30, 2008; which claims priority to German Patent Application No. DE 10 2007 052 098.2, filed Oct. 31, 2007, and claims the benefit to U.S. Provisional Patent Application No. 60/984,042, filed Oct. 31, 2007, the entire disclosures of which applications are hereby incorporated by reference.

BACKGROUND

The invention relates to a transverse splicing plate for creating a fuselage of an aircraft by connecting several CFP fuselage sections that have in particular been produced in the winding method, in each case by forming a transverse seam.

Furthermore, the invention relates to a method for connecting fuselage sections, in particular CFP fuselage sections that have been produced in the winding method, for creating a fuselage for an aircraft comprising such a transverse splicing plate.

US 2006/060705 A1, US 2005/213278 A1, U.S. Pat. No. 6,042,055 A and FR 808 710 A disclose the connection of fuselage sections by means of a splicing plate.

In modern aircraft engineering, by means of transverse splicing plates with the formation of circumferential transverse seams, several fuselage sections are joined to form complete aircraft fuselages. The transverse splicing plates are preferably, by means of riveting, riveted to the respectively to be joined ends of the fuselage sections. On both sides of the transverse seam, depending on the local load profile, two to three rows of rivets are circumferentially placed through the transverse splicing plate and the fuselage section skin. In the upper region of the fuselage section, preferably three rows of rivets are placed on both sides of the transverse seam, because in this zone essentially tensile stresses in longitudinal direction of the fuselage occur. In the lower region of the transverse seam, in which region the decisive structural loads are exerted as a result of compressive forces, generally two rows of rivets are applied to both sides of the circumferential transverse seam.

As a rule, the material used in the production of the transverse splicing plate corresponds to the material used for the fuselage section or for the fuselage skin. By means of the transverse splicing plates, tensile forces/compressive forces, shearing forces and circumferential forces are transferred from one fuselage section to the respectively adjacent fuselage section.

In order to save weight, fuselage sections are increasingly produced by means of the winding method with the use of composite materials, for example carbon-fibre-reinforced epoxy resin (CFP fuselage sections). Due to the normally large cross-sectional dimensions of wound CFP fuselage sections, dimensional variations result, in particular radial variations, between the fuselage sections to be joined, which variations are unavoidable in the production process but which render tension-free joining of the fuselage sections difficult or impossible. As a rule, the dimensional variations that occur cannot be compensated for with the use of conventional transverse splicing plates.

In order to nevertheless counter the problems associated with tolerances, wound CFP fuselage sections are not connected directly with a further wound CFP fuselage section. Instead, as a rule, each wound CFP fuselage section is followed by a CFP fuselage section that comprises at least two shells so that radial tolerances can better be compensated for; an arrangement which is, however, associated with increased production expenditure. A further option of compensating for tolerances consists of the use of compensation means in solid or liquid form, which, however, from the point of view of production are also unfavourable because they are time consuming.

SUMMARY OF THE INVENTION

It is thus the object of the invention to provide a transverse splicing plate that provides adequate flexibility to make it possible to directly join two wound CFP-component fuselage sections without the use of any additional tolerance compensation measures.

This object is met by a transverse splicing plate with the characteristics disclosed and described herein.

As a result of the transverse splicing plate comprising at least two plate segments arranged one above the other, as a result of each plate segment comprising a multitude of longitudinal slits for radial tolerance compensation between the fuselage sections, and as a result of the longitudinal slits in the plate segments being arranged so as to be offset relative to each other, there is good flexibility of the multilayer transverse splicing plate, in particular in radial direction of the longitudinal axis of the fuselage section so that direct joining of two wound CFP fuselage sections becomes possible without any further tolerance compensation measures. In particular, the longitudinal slits of at least two adjacent plate segments can be offset relative to each other or spaced apart from each other in circumferential direction so that they are not arranged one above the other.

In each case the longitudinal slits in the plate segments are arranged so as to be offset relative to each other so that no through-path through the longitudinal slits arises; an arrangement which among other things results in improved pressure tightness and improved strength of the transverse splicing-plate connection. By means of the number and arrangement of the longitudinal slits in the respective plate segments the flexibility of the transverse splicing plate can be influenced. The smaller the selected spacing between the longitudinal slits, the greater the flexibility of the transverse splicing plate, the greater the capacity for compensating for tolerance deviations between the fuselage sections, and the smaller the internal stresses occurring in the components during installation.

In order to connect two fuselage sections preferably at least three or four transverse splicing plates designed according to the invention are used, which, joining each other and on the inside connected to both fuselage sections, essentially cover the entire circumferential length of the cross-sectional geometry of the fuselage sections in the region of the transverse seam.

An improvement of the transverse splicing plates provides for the material thickness of the at least two plate segments arranged one above the other, viewed together, to exceed the thickness of the skin of the fuselage section. As a result of this, any damage in the region of the transverse seam, for example crack formation as a result of fatigue, tends to occur within the skin of the fuselage sections, which skin can be inspected more easily.

According to a further advantageous embodiment, the longitudinal slits are arranged in the plate segments so as to be equidistant from each other. This design makes possible tolerance compensation which is even in radial direction across the entire circumference of the fuselage section.

Further improvement of the transverse splicing plate provides for the skin of the fuselage sections to be joined, and for the transverse splicing plate to be made from the same material, in particular an aluminium alloy material or a CFP-composite material. In this way the occurrence of corrosion problems between the transverse splicing plates and the wound CFP fuselage sections is prevented.

According to a further embodiment, the longitudinal slits in the plate segments comprise recesses, in particular circular recesses. The circular recesses among other things prevent the occurrence of cracks when spreading the transverse splicing plate open in radial direction. At the same time the mobility of the transverse splicing plate in radial direction is improved.

A further embodiment of the transverse splicing plate provides for the it to comprise at least three plate segments arranged one above the other. In this way improved flexibility of the transverse splicing plate in radial direction is achieved so that larger tolerance deviations between the wound CFP fuselage sections can be compensated for.

Furthermore, the object of the invention is met by a method according to one or more embodiments employing the following steps:
a) joining, in particular riveting, the at least one transverse splicing plate to one end of a fuselage section;
b) sliding one end of a fuselage section, which is to be joined, onto the at least one transverse splicing plate in order to cause tolerance compensation between the fuselage sections in radial direction;
c) joining, in particular riveting, the at least one transverse splicing plate to the joined fuselage section.

In this way it is possible in particular for wound CFP fuselage sections with tolerance deviations that are unavoidable in the production process as far as their cross-sectional dimensions are concerned to be joined largely free of any stress. In this arrangement, tolerance compensation takes place by spreading apart or upsetting the longitudinal slits, wherein at the same time the plate segments in support of the procedure can slide one over the other in horizontal direction, in other words parallel to the longitudinal axis of the fuselage section.

First, the at least one flexible transverse splicing plate is connected to the end of a fuselage section, in particular riveted to said fuselage section. Then the fuselage section to be joined is slid onto the transverse splicing plate and connected, in particular riveted, to said splicing plate. In this process the plate segments, arranged one above the other, of the transverse splicing plate adapt to the required diameter, which takes place by spreading or by upsetting the longitudinal slits. After corresponding adaptation of the transverse splicing plate, in radial direction the transverse splicing plate can be riveted to the end of the fuselage section to be joined. Riveting results in a compact and essentially rigid connection between the two fuselage sections, which connection, as is also the case with conventional transverse splicing plates, also transfers all the forces.

As an alternative, connecting the fuselage sections can also take place by screwing or bonding.

Further advantageous embodiments of the method are disclosed and described herein.

BRIEF DESCRIPTION OF THE DRAWINGS

In the drawing the same constructive elements are designated by the same reference characters.

DETAILED DESCRIPTION OF THE INVENTION

Figure 1:
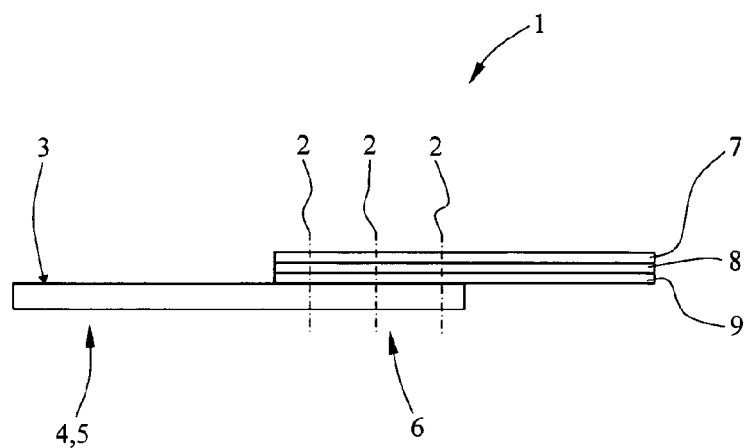
FIG. 1 a diagrammatic cross section of a flexible transverse splicing plate of multilayer construction according to the invention.

FIG. 1 shows a diagrammatic cross-sectional view of a transverse splicing plate according to the invention. By means of a multitude of rivet elements 2 the transverse splicing plate 1 is connected to the inside 3 of a skin 4 of a fuselage section 5 in the region of an end 6 of the fuselage section 5. In the embodiment shown the transverse splicing plate 1 comprises three plate segments 7 to 9 one arranged above the other. The rivet elements 2 are preferably arranged in at least three rows that extend evenly spaced apart from each other over the entire circumference of the barrel-shaped fuselage section 5. Instead of the shown rivet connections 2 the transverse splicing plate 1 can be connected with the use of any desired connection techniques, for example screwing, bonding, welding or any combination of these, on the inside to the skin 4.

Figure 2:
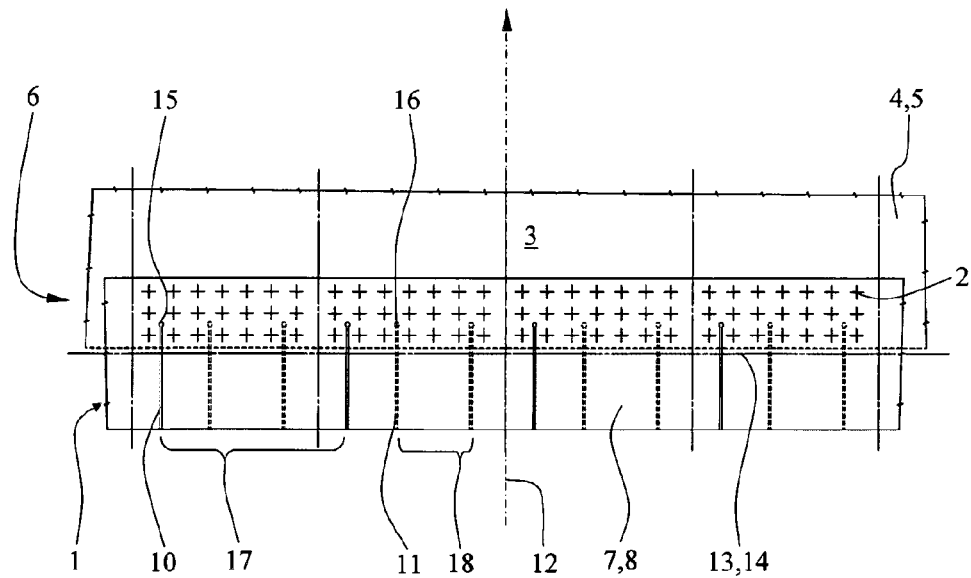
FIG. 2 a view of a transverse splicing plate attached to the fuselage section.

FIG. 2 shows a view of a transverse splicing plate connected to the fuselage section. To provide a better overview the drawing only shows two plate segments arranged one above the other (compare FIG. 1).

The transverse splicing plate 1 is connected, by means of a multitude of rivet connections 2 of which for the sake of clarity only one comprises a reference character, to the skin 4 in the region of the fuselage section end 6 of the fuselage section 5. In this arrangement the rivet connections 2 are, for example, arranged in three rows that are arranged in a matrix form side by side and that surround the barrel-shaped fuselage section 5. The section of the plate segment 7 of FIG. 2 comprises four longitudinal slits, of which for the sake of clarity only one longitudinal slit 10 has a reference character. The same applies to a longitudinal slit 11 in the plate segment 8 situated below it. All the longitudinal slits extend so as to be essentially parallel to a longitudinal axis 12 of the fuselage section 5 or to the fuselage (not shown) of the aircraft. All the longitudinal slits preferably extend beyond a mid-line 13 of the transverse splicing plate 1, wherein the mid-line 13 at the same time corresponds to a transverse seam 14 that forms between the fuselage sections to be joined. Depending on the local requirements, the longitudinal slits in each plate segment can have been placed uniformly or differently in relation to each other. At their ends the longitudinal slits 10, 11 in each case preferably comprise a recess or widening, and in particular a circular recess, of which only the recesses 15, 16 are shown with a reference character in a representative manner for all the remaining ones. The longitudinal slits 10, 11 have been placed in the plate segments 7, 8 so as to be offset to each other so that a through-path between the plate segments 7, 8 is prevented, which would result in problems relating to tightness and strength. As a result of the preferably circular recesses in the region of the ends of the longitudinal slits, local stress peaks are weakened, and the flexibility, in other words the ability of the longitudinal slits to vary their width as a result of upsetting or spreading apart, corresponding to the required tolerance compensation, in radial direction is improved overall. Approximately rectangular sub-plates 17, 18 arise between the longitudinal slits.

Starting from the innermost plate segment 7 to the outermost plate segment 9, the number of longitudinal slits 10, 11 from plate segment to plate segment may, if required, gradually be reduced, for example halved, or be reduced by a constant amount between "1" and "8" (compare in particular FIG. 2).

Figure 3:
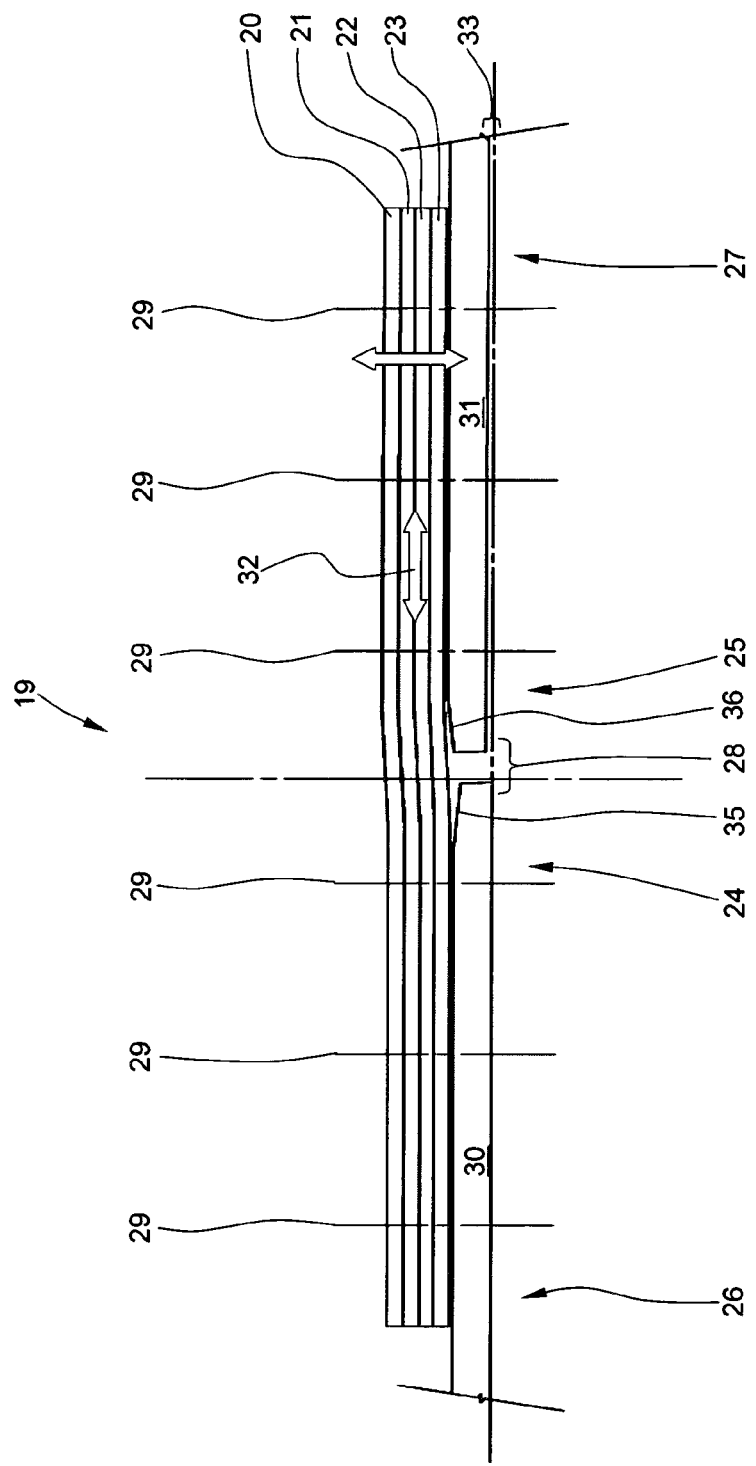
FIG. 3 the functional principle of the flexible transverse splicing plate for radial tolerance compensation between fuselage sections.

FIG. 3 diagrammatically illustrates the functional principle of a flexible transverse splicing plate for radial tolerance compensation between wound CFP fuselage sections that are to be joined.

In this exemplary embodiment a transverse splicing plate 19 comprises four plate segments 20 to 23, arranged one above the other, and connects two ends 24, 25 of a left-hand and of a right-hand wound fuselage section and in particular of a CFP fuselage section 26, 27 while forming a common transverse seam 28. In the exemplary embodiment shown, connection of the two fuselage sections 26, 27 takes place by a multitude of rivet elements 29 that in a matrix shape are arranged in a total of six rows that extend perpendicularly to the drawing plane, which rivet elements 29 in each case penetrate both the transverse splicing plate 19 and both skins 30, 31 of the two fuselage sections 26, 27. Prior to placement of the rivet elements 29 in the region of the left-hand fuselage section 26 the plate segments 20 to 23 in the region of the right-hand fuselage section 27 can glide onto each other in the direction of the horizontally extending double arrow 32, and consequently a radial offset 33 between the ends 24, 25 of the fuselage sections 26, 27 is compensated for. The multilayer transverse splicing plate 19 of flexible design thus makes it possible to directly connect two wound CFP fuselage sections 26, 27 which comprise variations in their cross-sectional dimensions that are unavoidable in the production process.

In this arrangement, the part of the transverse splicing plate 19 that at this stage is not yet riveted, for connection of the right-hand fuselage section 27 can move up and down in the direction of the vertical double arrow 34 depending on the radial compensation requirements. In order to facilitate tolerance compensation and the mobility of the transverse splicing plate 19 both the left-hand and the right-hand fuselage sections 26, 27 in the region of the two ends 24, comprise chamfers 35, 36, in other words edges that on the inside extend downwards in a slightly bevelled manner. After tolerance compensation has been implemented, the right-hand fuselage section 27 can also be connected to the transverse splicing plate 19 by means of the rivet elements 29.

Figure 4:
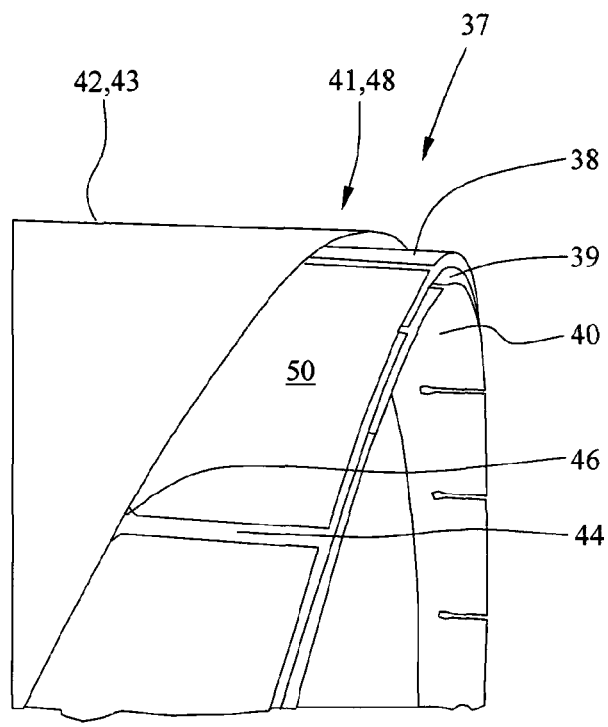
FIG. 4 a simplified perspective external view (section) of one end of a fuselage section comprising a transverse splicing plate.
Figure 5:
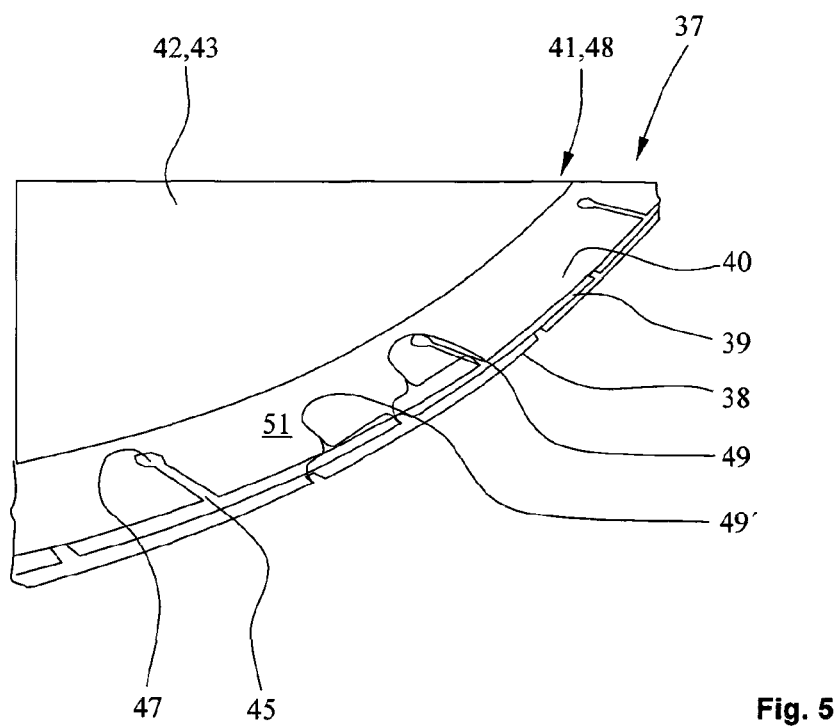
FIG. 5 a simplified perspective internal view (section) of one end of a fuselage section comprising a transverse splicing plate.

In the further course of the description reference is made at the same time to FIGS. 4 and 5. FIG. 4 shows a perspective external view of one end of a fuselage section with a transverse splicing plate designed according to the invention, while FIG. 5 shows an interior view of the transverse splicing plate that is connected on one side. In the illustration of FIGS. 4, 5 the transverse splicing plate 37 comprises three plate segments 38 to 40 that are arranged one above the other. On the inside the transverse splicing plate 37 is connected, in particular riveted, screwed, bonded, or connected in some other way, to the end 41 of a skin 42 of a fuselage section 43. The transverse splicing plate 37, which on the inside is circumferentially attached to the end of the fuselage section, can be made in one piece or it can comprise several sections in the shape of an arc of a circle, which sections preferably join each other. Each of the plate segments 38 to 40 comprises a multitude of longitudinal slits, of which for the sake of clarity only one longitudinal slit 44 in the plate segment 38 is shown in a representative manner for the others, and one longitudinal slit 45 in the plate segment 40 comprises a reference character that is representative for all the others. The longitudinal slits can be arranged at even spacing relative to each other across the circumference of the respective plate segments 38 to 40. As an alternative, uneven spacing depending on the local flexibility requirements of the transverse splicing plate 37 is possible.

All or at least some of the longitudinal slits, on their side facing the skin 42, or on the side of the transverse splicing plate 37, which side points away from the transverse seam, comprise circular recesses, of which only the recesses 46, 47 in the longitudinal slits 44, 45 are designated by reference characters representative of the others. In the region of a transverse seam 48 a further fuselage section 43 (not shown) that is to be joined adjoins. The circular recess 46 in the longitudinal slit 44 is partly covered by the skin 42 (compare FIG. 4). As is shown in particular in FIG. 5 the longitudinal slits within each plate segment 38 to 40 in relation to the longitudinal slits in the adjacent plate segment 38 to 40 are arranged so as to be offset relative to each other by a longitudinal amount 49, 49'. In this way a through-path between the longitudinal slits is avoided and the pressure-tightness of the entire arrangement is improved. Between the longitudinal slits, for example, essentially rectangular sub-plates 50, 51 form, which during flexible compensation movements of the transverse splicing plate 37 in radial direction slide one above the other in axial direction. Thus the multi-layer transverse splicing plate 37, which comprises longitudinal slits, allows tolerance compensation between fuselage sections of differing cross-sectional dimensions. In each case the sub-plates 50, 51 are slightly curved, in other words they are designed to in each case follow the local curvature of the fuselage sections that are to be joined.

A method according to the invention with the use of the flexible transverse splicing plate described in the introduction is essentially characterised by the sequence of the following work steps:

First of all, in a first method-related step, a circumferential transverse splicing plate is connected, on the inside, to the skin of one end of an essentially barrel-shaped fuselage section, in particular riveted to said skin. The circumferential edge of the skin, or the subsequently forming region of the transverse seam, extends approximately in the middle in relation to the transverse splicing plate. In order to facilitate tolerance compensation between this first fuselage section and a further fuselage section to be joined, the ends of both fuselage sections can comprise chamfers on the inside (compare FIG. 3).

In a second method-related step the fuselage section to be joined is slid onto the transverse splicing plate, wherein as a result of the transverse splicing plate that comprises several plate segments arranged one above the other, which plate segments are longitudinally slit, tolerance compensation relating to different cross-sectional dimensions of the fuselage sections takes place by radial bending of the individual plate segments. Prior to the second method-related step or on completion of the second method-related step, if necessary additional sealing measures can take place, for example placing sealing compound into the region of the transverse seam that is forming, in order to ensure the required pressure resistance of the fuselage formed in this way.

In a third method-related step connection of the adjoined fuselage section to the transverse splicing plate takes place with the formation of the final transverse seam between both fuselage sections, in particular by riveting.

If need be, in particular in the case of substantial tolerance deviations between the cross-sectional dimensions of the fuselage sections to be joined, in individual cases it may be necessary to place additional means for tolerance compensation, for example strip-shaped material add-ons or curable plastic materials for gap filling, into the region of the transverse seam.

By repeating the method-related steps 1 to 3 aircraft fuselages of any desired length can be produced from a multitude of wound CFP fuselage sections, wherein the requirements relating to production accuracy of the cross-sectional dimensions of the wound CFP fuselage sections to be joined are relatively modest.

LIST OF REFERENCE CHARACTERS

1 Transverse splicing plate
2 Rivet element (connecting element)
3 Inside
4 Skin (outside)
5 Fuselage section
6 End (fuselage section)
7 Plate segment
8 Plate segment
9 Plate segment
10 Longitudinal slit
11 Longitudinal slit
12 Longitudinal axis
13 Mid-line
14 Transverse seam
15 Recess (circular)
16 Recess (circular)
17 Sub-plate
18 Sub-plate
19 Transverse splicing plate
20 Plate segment
21 Plate segment
22 Plate segment
23 Plate segment
24 End (left-hand fuselage section)
25 End (right-hand fuselage section)
26 Fuselage section (left-hand side)
27 Fuselage section (right-hand side)
28 Transverse seam
29 Rivet element (connecting element)
30 Skin (left-hand fuselage section)
31 Skin (right-hand fuselage section)
32 Double arrow
33 Offset (radial)
34 Double arrow
35 Chamfer (bevel)
36 Chamfer (bevel)
37 Transverse splicing plate
38 Plate segment
39 Plate segment
40 Plate segment
41 End (fuselage section)
42 Skin
43 Fuselage section
44 Longitudinal slit
45 Longitudinal slit
46 Recess (circular)
47 Recess (circular)
48 Transverse seam
49 Longitudinal amount
50 Sub-plate
51 Sub-plate

The invention claimed is:

1. A transverse splicing plate and fuselage sections combination, comprising:
    first and second fuselage sections oriented in an abutting relationship along a longitudinal axis, thereby forming a transverse seam,
    a transverse splicing plate having at least two plate segments arranged one radially above the other with respect to the longitudinal axis, each of the plate segments having a multitude of longitudinal slits for radial tolerance compensation between the first and second fuselage sections, and the longitudinal slits being tangentially offset relative to each other,
    wherein the transverse splicing plate spans the transverse seam and overlies respective end portions of the first and second fuselage sections, such that the longitudinal slits extend substantially parallel to the longitudinal axis and span the transverse seam,
    wherein at least one of:
    the longitudinal slits comprise a recess at an end thereof, and
    the recess is a circular recess.

2. The transverse splicing plate and fuselage sections combination according to claim 1, wherein a material thickness of the at least two plate segments exceeds a material thickness of each of the fuselage sections.

3. The transverse splicing plate and fuselage sections combination according to claim 1, wherein the longitudinal slits are arranged so as to be evenly spaced apart from each other, thus forming a multitude of sub-plates.

4. The transverse splicing plate and fuselage sections combination according to claim 1, wherein at least one of:
    the plate segments are made from a same material as respective skins of the fuselage sections that are to be joined, and
    the material is a composite material or an aluminum alloy material.

5. The transverse splicing plate and fuselage sections combination according to claim 1, wherein at least one of:
    the transverse splicing plate is connected to the respective end portions of the first and second fuselage sections by means of a multitude of connecting elements, and
    the connecting elements are rivet elements.

6. The transverse splicing plate and fuselage sections combination according to claim 1, wherein at least three plate segments arranged one above the other in the radial direction form the transverse splicing plate.

7. A transverse splicing plate and fuselage sections combination, comprising:
    first and second fuselage sections, which have been produced in a winding method as CFP sections, oriented in an abutting relationship along a longitudinal axis, thereby forming a transverse seam,
    a transverse splicing plate having at least two plate segments arranged one radially above the other with respect to the longitudinal axis, each of the plate segments having a multitude of longitudinal slits for radial tolerance compensation between the first and second fuselage sections, the longitudinal slits being tangentially offset relative to each other and including at least partially circular recess at an end thereof,
    wherein the transverse splicing plate spans the transverse seam and overlies respective end portions of the first and second fuselage sections, such that the longitudinal slits extend substantially parallel to the longitudinal axis and span the transverse seam.

* * * * *